US011623558B2

(12) United States Patent
Fushimi et al.

(10) Patent No.: US 11,623,558 B2
(45) Date of Patent: Apr. 11, 2023

(54) SENSOR SYSTEM (71) Applicant: KOITO MANUFACTURING CO., LTD., Tokyo (JP)

(72) Inventors: Yoshiaki Fushimi, Shizuoka (JP); Takashi Hori, Shizuoka (JP); Teruaki Yamamoto, Shizuoka (JP); Yusuke Kasaba, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 907 days.

(21) Appl. No.: 16/333,011

(22) PCT Filed: Sep. 14, 2017

(86) PCT No.: PCT/JP2017/033286
§ 371 (c)(1),
(2) Date: Mar. 13, 2019

(87) PCT Pub. No.: WO2018/052087
PCT Pub. Date: Mar. 22, 2018

(65) Prior Publication Data
US 2019/0275923 A1 Sep. 12, 2019

(30) Foreign Application Priority Data
Sep. 15, 2016 (JP) .............................. JP2016-180579

(51) Int. Cl.
*B60Q 1/00* (2006.01)
*B60R 11/04* (2006.01)
(Continued)

(52) U.S. Cl.
CPC ............ *B60Q 1/0023* (2013.01); *B60R 11/04* (2013.01); *B60R 21/00* (2013.01); *F21V 23/00* (2013.01);
(Continued)

(58) Field of Classification Search
None
See application file for complete search history.

(56) References Cited

U.S. PATENT DOCUMENTS 5,574,426 A * 11/1996 Shisgal ................. G01S 15/931
180/271
6,380,883 B1 * 4/2002 Bell ....................... G01S 13/931
342/70
(Continued)

FOREIGN PATENT DOCUMENTS

EP 3396412 A1 10/2018
GB 2328819 A * 3/1999 ........... G01S 13/931
(Continued)

OTHER PUBLICATIONS

European Search Opinion from the European Patent Office for application EP17850987, dated Mar. 18, 2020. (Year: 2020).*
(Continued)

*Primary Examiner* — Bernarr E Gregory
(74) *Attorney, Agent, or Firm* — Sughrue Mion, PLLC (57) ABSTRACT A left front camera (11) is adapted to be mounted on a left front lamp (1LF) of a vehicle to obtain external information of at least ahead of the vehicle. A right front LiDAR sensor (12), a type of which is different from the camera (11), is adapted to be mounted on a right front lamp (1RF) of the vehicle to obtain external information of at least ahead of the vehicle.

13 Claims, 8 Drawing Sheets (51) Int. Cl.
- B60R 21/00 (2006.01)
- F21V 23/00 (2015.01)
- G01S 7/03 (2006.01)
- G01S 13/86 (2006.01)
- G01S 13/93 (2020.01)
- G01S 13/931 (2020.01)
- G01S 15/93 (2020.01)
- G01S 17/86 (2020.01)
- G01S 17/87 (2020.01)
- G01S 17/93 (2020.01)
- G01S 17/931 (2020.01)
- B60R 11/00 (2006.01)

(52) U.S. Cl.
CPC ............ *G01S 7/03* (2013.01); *G01S 13/86* (2013.01); *G01S 13/862* (2013.01); *G01S 13/865* (2013.01); *G01S 13/867* (2013.01); *G01S 13/93* (2013.01); *G01S 13/931* (2013.01); *G01S 15/93* (2013.01); *G01S 17/86* (2020.01); *G01S 17/87* (2013.01); *G01S 17/93* (2013.01); *G01S 17/931* (2020.01); *B60R 2011/0043* (2013.01); *G01S 2013/93277* (2020.01)

(56) References Cited

U.S. PATENT DOCUMENTS

| | | |
|---|---|---|
| 2004/0001019 A1 | 1/2004 | Nakazawa et al. |
| 2005/0062615 A1 | 3/2005 | Braeuchle et al. |
| 2008/0158045 A1* | 7/2008 | Teranishi .............. G01S 13/931 342/70 |
| 2011/0279304 A1* | 11/2011 | Yonemoto ............. G01S 13/931 342/52 |
| 2014/0247349 A1 | 9/2014 | Heard |

FOREIGN PATENT DOCUMENTS

| | | |
|---|---|---|
| JP | S59-198377 A | 11/1984 |
| JP | H05-27037 A | 2/1993 |
| JP | 2003-329773 A | 11/2003 |
| JP | 2005-505074 A | 2/2005 |
| WO | 2017110415 A1 | 6/2017 |

OTHER PUBLICATIONS

Written Opinion (PCT/ISA/237) issued by the International Searching Authority in corresponding International Application No. PCT/JP2017/033286, dated Nov. 28, 2017.

International Search Report (PCT/ISA/210), issued by International Searching Authority in corresponding International Application No. PCT/JP2017/033286, dated Nov. 28, 2017.

* cited by examiner

SENSOR SYSTEM

TECHNICAL FIELD

The presently disclosed subject matter relates to a sensor system adapted to be mounted on a vehicle.

BACKGROUND ART

Patent Document 1 discloses a configuration in which a laser radar device is disposed in a lamp chamber of a head lamp. The head lamp lights an area ahead of the vehicle. The laser radar device obtains information of ahead of the vehicle, such as the distance to a vehicle ahead of the own vehicle.

PRIOR ART DOCUMENT

Patent Document

Patent Document 1: Japanese Patent Publication No. H05-027037A

SUMMARY

Technical Problem

With the advancement of driving support technology, it is demanded to obtain more diverse information from the outside of the vehicle. In order to meet this demand, the type of sensor for obtaining information of the outside of the vehicle may be increased. However, as the number of types of sensors increases, it is inevitable to increase the costs.

It is thus demanded to efficiently obtain diverse external information of the vehicle while suppressing the increase of the costs.

Solution to Problem

In order to meet the demand described above, a first illustrative aspect of the presently disclosed subject matter provides a sensor system adapted to be mounted on a vehicle, comprising:
  a first sensor adapted to be mounted on a left lamp of the vehicle to obtain external information of at least in a front-rear direction of the vehicle; and
  a second sensor adapted to be mounted on a right lamp of the vehicle to obtain external information of at least in the front-rear direction of the vehicle,
  wherein a type of the first sensor and a type of the second sensor are different from each other.

When attempting to obtain information of at least in the front-rear direction of the vehicle, there could be a case where a sensing range of the sensor to be mounted on the left front lamp and a sensing range of the sensor to be mounted on the right front lamp overlap at least partially. In this case, the same information is obtained in duplicate from the areas where the sensing ranges overlap with each other.

In the above configuration, the redundancy (in the meaning that the same information is obtained in duplicate) is eliminated by intentionally making the type of the sensor to be mounted on the left lamp to obtain external information of at least in the front-rear direction of the vehicle and the type of the sensor to be mounted on the right lamp to obtain external information at least in the front-rear direction of the vehicle different from each other. On the other hand, by using a plurality of sensors of different types, the external information obtained from at least in the front-rear direction of the vehicle is made diverse. Therefore, it is possible to efficiently obtain diverse external information of the vehicle while suppressing the increase of the costs.

The sensor system according to the first illustrative aspect may be configured such that:
  the first sensor includes a first combination of plural types of sensors;
  the second sensor includes a second combination of plural types of sensors; and
  the first combination and the second combination are different from each other.

By increasing the types of sensors to be mounted on the respective lamps, it is possible to obtain more diverse external information. On the other hand, by making the combination of the types of sensors to be mounted on the left lamp and the combination of the types of sensors to be mounted on the right lamp different from each other, the redundancy (in the meaning that the same information is obtained in duplicate) is eliminated. Accordingly, it is possible to efficiently obtain more diverse external information of the vehicle while suppressing the increase of the costs.

In addition, by obtaining diverse external information through a plurality of sensors of different types, different external information can be complementarily used.

For example, the sensor system according to the first illustrative aspect may be configured such that:
  one of the first sensor and the second sensor includes a camera; and
  the other of the first sensor and the second sensor includes a LiDAR sensor.

According to such a configuration, the distance to an object captured by the camera can be accurately specified using the information obtained by the LiDAR sensor. Conversely, the type of an object whose presence is sensed by the LiDAR sensor, such as a vehicle ahead of the own vehicle or a pedestrian, can be accurately specified using the information obtained by the camera.

Alternatively, the sensor system according to the first illustrative aspect may be configured such that:
  one of the first sensor and the second sensor includes a millimeter wave radar; and
  the other of the first sensor and the second sensor includes a LiDAR sensor.

The millimeter wave radar is characterized by a long sensing distance and a high sensing speed. Therefore, it is enabled such a sensing manner that the presence of an object that is present in at least in the front-rear direction the vehicle 1 is first sensed by the millimeter wave radar, and then the attribute of the object is accurately specified using the information obtained by the LiDAR sensor.

Alternatively, the sensor system according to the first illustrative aspect may be configured such that:
  one of the first sensor and the second sensor includes a millimeter wave radar; and
  the other of the first sensor and the second sensor includes an ultrasonic sensor.

The ultrasonic sensor is characterized by a short sensing distance but a low component cost. On the other hand, the millimeter wave radar is characterized by a long sensing distance and a high sensing speed. Therefore, it is possible to obtain a configuration capable of detecting both an object located at a short distance and an object located at a long distance with respect to the vehicle while suppressing the costs.

Alternatively, the sensor system according to the first illustrative aspect may be configured such that:

one of the first sensor and the second sensor includes a millimeter wave radar; and the other of the first sensor and the second sensor includes a camera.

The millimeter wave radar is characterized by a long sensing distance and a high sensing speed. Therefore, it is enabled such a sensing manner that the presence of an object that is present in at least in the front-rear direction of the vehicle is first sensed by the millimeter wave radar, and then the attribute of the object is accurately specified using the information obtained by the camera.

In order to meet the demand described above, a second illustrative aspect of the presently disclosed subject matter provides a sensor system adapted to be mounted on a vehicle, comprising:

a first sensor adapted to be mounted on a left lamp of the vehicle to obtain external information of at least in a front-rear direction of the vehicle; and a second sensor adapted to be mounted on a right lamp of the vehicle to obtain external information of at least in the front-rear direction of the vehicle, wherein a first sensing range of the first sensor and a second sensing range of the second sensor are different from each other.

When attempting to obtain information of at least in the front-rear direction of the vehicle, there could be a case where a sensing range of the sensor to be mounted on the left front lamp and a sensing range of the sensor to be mounted on the right front lamp overlap at least partially. In this case, the same information is obtained in duplicate from the areas where the sensing ranges overlap with each other.

In the above configuration, the redundancy (in the meaning that the same information is obtained in duplicate) is eliminated by intentionally making the sensing range of the first sensor to be mounted on the left lamp to obtain external information of at least in the front-rear direction of the vehicle and the sensing range of the second sensor to be mounted on the right lamp to obtain external information at least in the front-rear direction of the vehicle different from each other. On the other hand, by making the sensing ranges different from each other, the external information obtained from at least in the front-rear direction of the vehicle is made diverse. Therefore, it is possible to efficiently obtain diverse external information of the vehicle while suppressing the increase of the costs.

The sensor system according to the second illustrative aspect may be configured such that a type of the first sensor and a type of the second sensor are identical with each other.

According to such a configuration, it is possible to further suppress component costs as compared with the case where the type of the sensor to be mounted on the left lamp is made different from the type of the sensor to be mounted on the right lamp.

The sensor system according to the second illustrative aspect may be configured such that:

one of the first sensing range and the second sensing range is longer than the other of the first sensing range and the second sensing range in the front-rear direction of the vehicle; and the other of the first sensing range and the second sensing range is wider than the one of the first sensing range and the second sensing range in a left-right direction of the vehicle.

According to such a configuration, a blind area in one of the sensing ranges of the left first sensor and the second sensor can be efficiently compensated for by the other.

The sensor system according to the second illustrative aspect may be configured such that the first sensor and the second sensor include at least one of a camera, a LiDAR sensor, a millimeter wave radar, and an ultrasonic sensor.

The sensor system according to the second illustrative aspect may be configured so as to further comprise:

a third sensor adapted to be mounted on the left lamp to obtain external information of at least on the left of the vehicle; and a fourth sensor adapted to be mounted on the right lamp to obtain external information of at least on the right of the vehicle, wherein a type of the third sensor and a type of the fourth sensor are identical with each other.

While the type of information to be obtained from at least on the left of the vehicle and the type of information to be obtained from at least on the right of the vehicle are the same, the sensing range of the sensor to obtain information from at least on the left of the vehicle and the sensing range of the sensor to obtain information from at least on the right of the vehicle are unlikely to overlap. Therefore, by matching the types of the both sensors, the external information of the vehicle can be accurately obtained from a wider range.

DESCRIPTION OF EMBODIMENTS

Examples of embodiments will be described below in detail with reference to the accompanying drawings. In each of the drawings used in the following descriptions, the scale is appropriately changed in order to make each of the members have a recognizable size.

In the accompanying drawings, an arrow F represents a forward direction of the illustrated structure. An arrow B represents a rearward direction of the illustrated structure. An arrow L represents a leftward direction of the illustrated structure. An arrow R represents a rightward direction of the illustrated structure. The terms of "left" and "right" used in the following descriptions indicate the left-right directions as viewed from the driver's seat.

Figure 1:
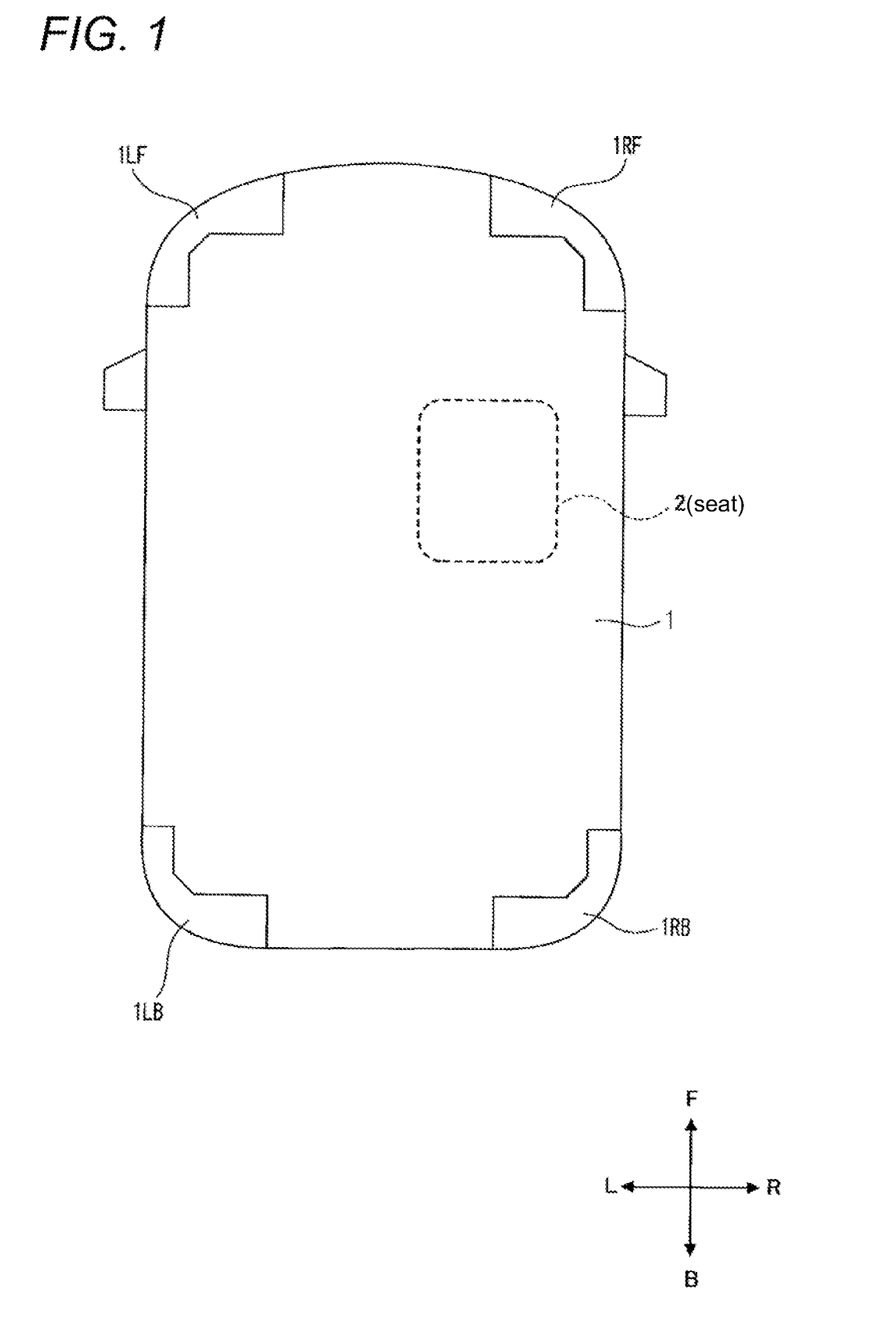
FIG. 1 illustrates a vehicle on which a sensor system according to a first embodiment is to be mounted.

FIG. 1 schematically illustrates a vehicle 1 on which a sensor system according to an embodiment is to be mounted. The vehicle 1 includes a left front lamp 1LF and a right front lamp 1RF.

The left front ramp 1LF (one example of the left lamp) is disposed at a left front corner portion of the vehicle 1. As used herein, the expression "a left front corner portion of the vehicle 1" means a portion included in a front portion of the vehicle 1 and located on the left of a center in the left-right direction of the vehicle 1. As used herein, the expression "a front portion of the vehicle 1" means a portion of a vehicle body of the vehicle 1 situating ahead of a driver's seat 2.

The right front ramp 1RF (one example of the right lamp) is disposed at a right front corner portion of the vehicle 1. As used herein, the expression "a right front corner portion of the vehicle 1" means a portion included in a front portion of the vehicle 1 and located on the right of the center in the left-right direction of the vehicle 1.

Figure 2:
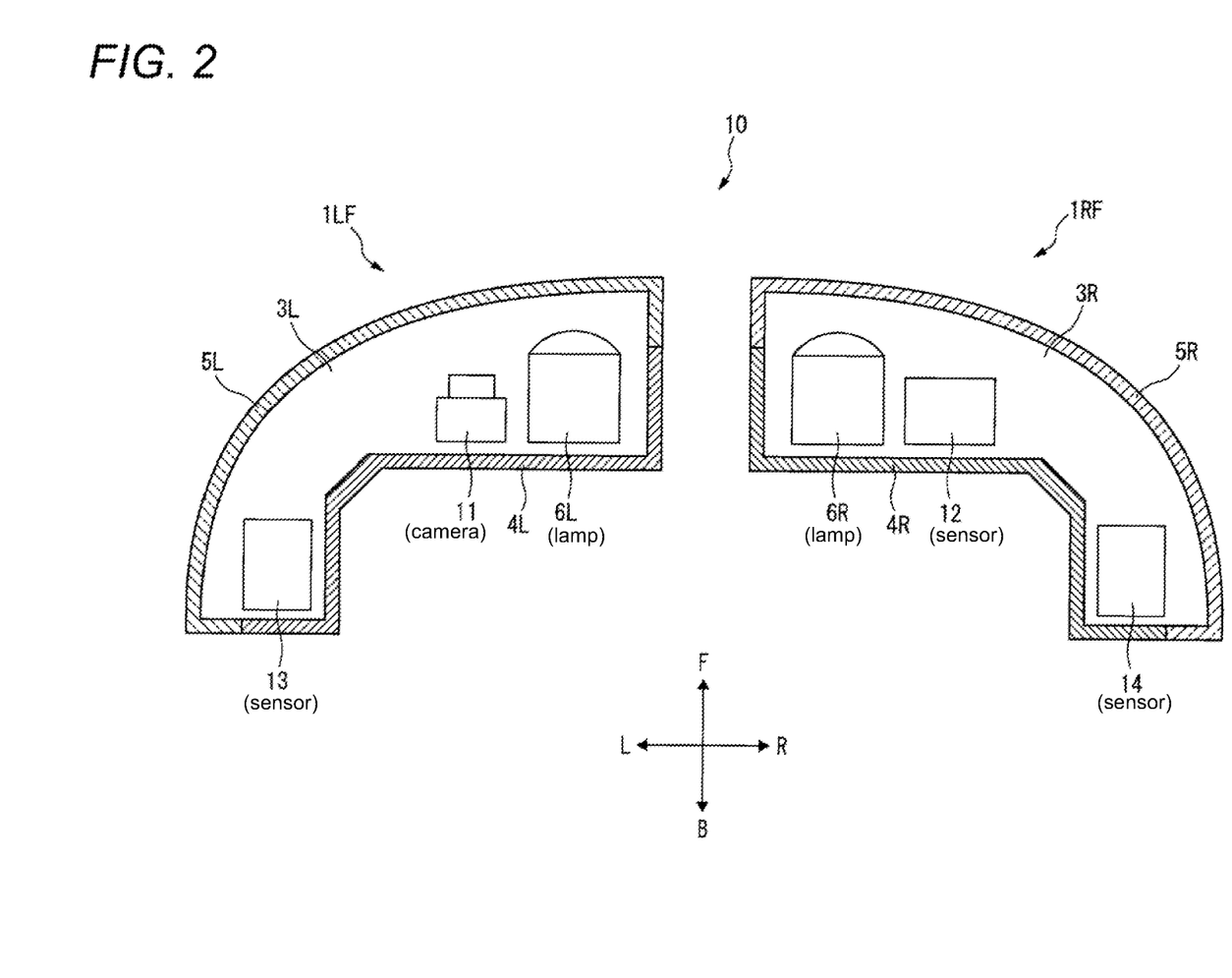
FIG. 2 illustrates a configuration of the sensor system according to the first embodiment.

As illustrated in FIG. 2, the left front lamp 1LF includes a left front lamp housing 4L and a left front translucent cover 5L that define a left front lamp chamber 3L. A left head lamp 6L is housed in the left front lamp chamber 3L. The light emitted from the left head lamp 6L passes through the left front translucent cover 5L and illuminates at least ahead of the vehicle 1.

Similarly, the right front lamp 1RF includes a right front lamp housing 4R and a right front translucent cover 5R that define a right front lamp chamber 3R. A right head lamp 6R is housed in the right front lamp chamber 3R. The light emitted from the right head lamp 6R passes through the right front translucent cover 5R and illuminates at least ahead of the vehicle 1.

A sensor system 10 according to a first embodiment includes a left front camera 11 and a LiDAR (Light Detection and Ranging) sensor 12.

The left front camera 11 (one example of the first sensor) is mounted in the left front lamp chamber 3L of the left front lamp 1LF. The left front camera 11 captures an image of at least ahead of the vehicle 1. That is, the left front camera 11 serves as a sensor for obtaining external information of at least ahead of the vehicle 1 (one example of the front-rear direction of the vehicle).

The right front LiDAR sensor 12 (one example of the second sensor) has a configuration for emitting non-visible light and a configuration for sensing returned light as a result of the non-visible light being reflected by an object that is present at least ahead of the vehicle 1. In the present embodiment, infrared light having a wavelength of 905 nm is used as the non-visible light.

The right front LiDAR sensor 12 can obtain the distance to the object associated with the returned light, for example, based on the time period from the time when the non-visible light is emitted in a certain direction to the time when the returned light is sensed. Further, by accumulating such distance data in association with the sensing position, it is possible to obtain information as to the shape of the object associated with the returned light. Additionally or alternatively, information as to an attribute such as the material of the object associated with the returned light can be obtained based on the difference in wavelength between the emitted light and the returned light. Additionally or alternatively, information about the color of the object, such as a white line on the road surface, can be obtained, for example, based on the difference in reflectivity of the returned light from the road surface. That is, the right front LiDAR sensor 12 serves as a sensor for obtaining external information of at least ahead of the vehicle 1 (one example of the front-rear direction of the vehicle).

That is, in the sensor system 10, the type of the sensor to be mounted on the left front lamp 1LF is different from the type of the sensor to be mounted on the right front lamp 1RF.

When attempting to obtain information of at least ahead of the vehicle 1, there could be a case where a sensing range of the sensor to be mounted on the left front lamp 1LF and a sensing range of the sensor to be mounted on the right front lamp 1RF overlap at least partially. In this case, the same information is obtained in duplicate from the areas where the sensing ranges overlap with each other.

In the present embodiment, the redundancy (in the meaning that the same information is obtained in duplicate) is eliminated by intentionally making the type of the sensor to be mounted on the left front lamp 1LF to obtain external information of at least ahead of the vehicle 1 and the type of the sensor to be mounted on the right front lamp 1RF to obtain external information at least ahead of the vehicle 1 different from each other. On the other hand, by using a plurality of sensors of different types, the external information obtained from at least ahead of the vehicle 1 is made diverse. Therefore, it is possible to efficiently obtain diverse external information of the vehicle 1 while suppressing the increase of the costs.

In addition, by obtaining diverse external information through a plurality of sensors of different types, different external information can be complementarily used. In the present embodiment, the left front camera 11 is mounted on the left front lamp 1LF, and the right front LiDAR sensor 12 is mounted on the right front lamp 1RF.

According to such a configuration, the distance to an object captured by the left front camera 11 can be accurately specified using the information obtained by the right front LiDAR sensor 12. Conversely, the type of an object whose presence is sensed by the right front LiDAR sensor 12, such as a vehicle ahead of the own vehicle or a pedestrian, can be accurately specified using the information obtained by the left front camera 11.

The sensor system 10 includes a left LiDAR sensor 13 mounted in the left front lamp chamber 3L of the left front lamp 1LF. The left LiDAR sensor 13 (one example of the third sensor) is disposed so as to obtain external information of at least on the left of the vehicle 1.

The sensor system 10 includes a right LiDAR sensor 14 mounted in the right front lamp chamber 3R of the right front lamp 1RF. The right LiDAR sensor 14 (one example of the fourth sensor) is disposed so as to obtain external information of at least on the right of the vehicle 1.

That is, the type of the sensor to be mounted on the left front lamp 1LF for obtaining information of at least on the left of the vehicle 1 is the same as the type of the sensor to be mounted on the right front lamp 1RF for obtaining information of at least on the right of the vehicle 1.

While the type of information to be obtained from at least on the left of the vehicle 1 and the type of information to be obtained from at least on the right of the vehicle 1 are the same, the sensing range of the sensor to obtain information from at least on the left of the vehicle 1 and the sensing range of the sensor to obtain information from at least on the right of the vehicle 1 are unlikely to overlap. Therefore, by matching the types of the both sensors, the external information of the vehicle 1 can be accurately obtained from a wider range.

Figure 3:
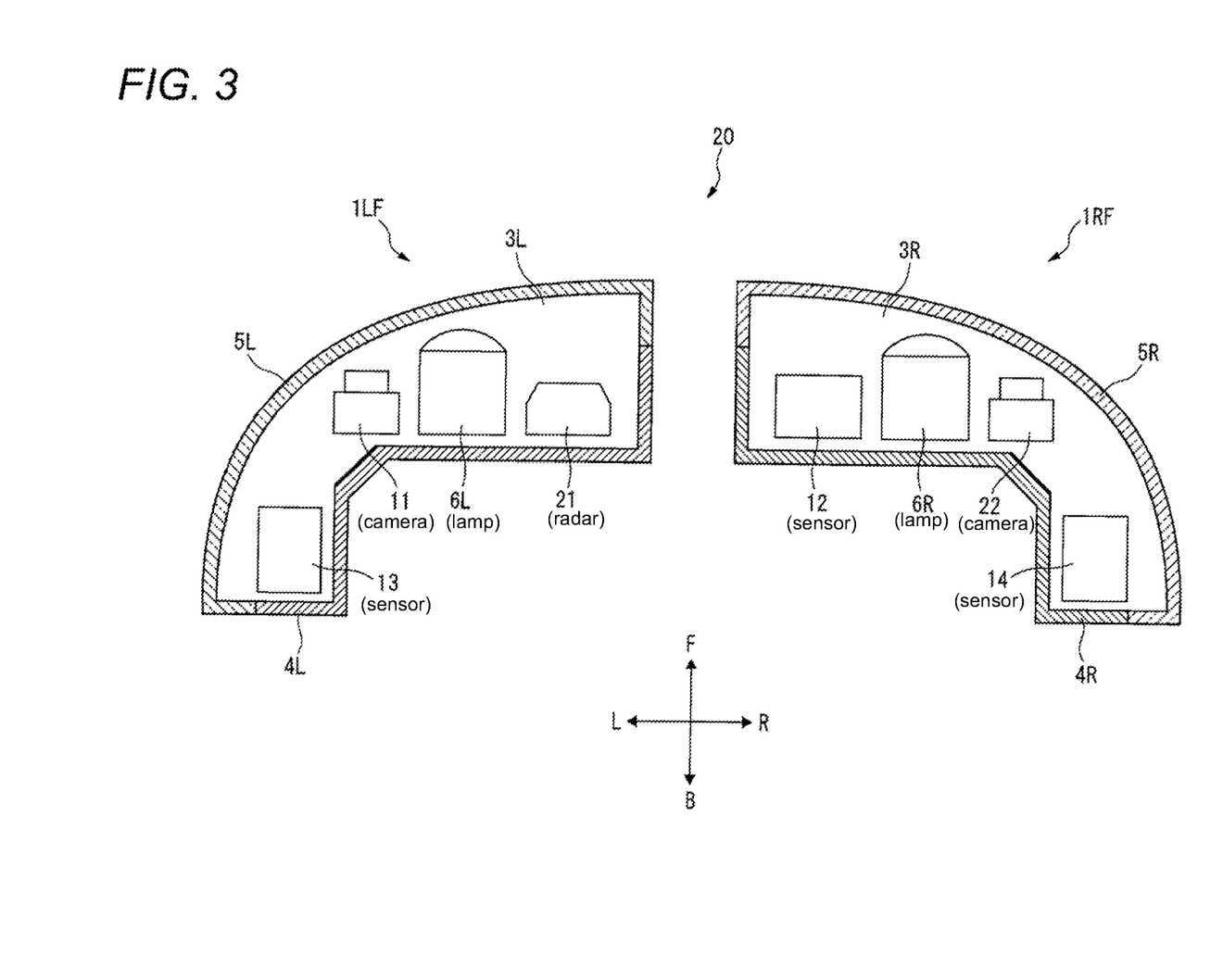
FIG. 3 illustrates a configuration of the sensor system according to a second embodiment.

FIG. 3 schematically illustrates a sensor system 20 according to a second embodiment. Components that are the same as or equivalent to those of the sensor system 10 according to the first embodiment are assigned with the same reference numerals, and repetitive descriptions for those will be omitted.

In addition to the configuration described with reference to the sensor system 10, the sensor system 20 includes a left front millimeter wave radar 21 and a right front camera 22.

The left front millimeter wave radar 21 (one example of the first sensor) is mounted in the left front lamp chamber 3L of the left front lamp 1LF. The left front millimeter wave radar 21 has a configuration for transmitting a millimeter wave and a configuration for receiving a reflected wave as a result of the millimeter wave being reflected by an object that is present at least ahead of the vehicle 1. In the present embodiment, a millimeter wave having a frequency of 76 GHz is used. Examples of other frequencies include 24 GHz, 26 GHz, 79 GHz, etc.

The left front millimeter wave radar 21 can obtain the distance to the object associated with the reflected wave, for example, based on the time period from the time when the millimeter wave is transmitted in a certain direction to the time when the reflected wave is received. Further, by accumulating such distance data in association with the sensing position, it is possible to obtain information as to the shape of the object associated with the reflected wave. That is, the left front millimeter wave radar 21 serves as a sensor for obtaining external information of at least ahead of the vehicle 1 (one example of the front-rear direction of the vehicle).

The right front camera 22 (one example of the second sensor) is mounted in the right front lamp chamber 3R of the right front lamp 1RF. The right front camera 22 captures an image of at least ahead of the vehicle 1. That is, the right front camera 22 serves as a sensor for obtaining external information of at least ahead of the vehicle 1 (one example of the front-rear direction of the vehicle).

In other words, a combination of a plurality of types of sensors to be mounted on the left front lamp 1LF (the camera and the millimeter wave radar; one example of the first combination) and a combination of a plurality of types of sensors to be mounted on the right front lamp 1RF (the camera and the LiDAR sensor; one example of the second combination) are different from each other.

By increasing the types of sensors to be mounted on the respective lamps, it is possible to obtain more diverse external information. On the other hand, by making the combination of the types of sensors to be mounted on the left front lamp 1LF and the combination of the types of sensors to be mounted on the right front lamp 1RF different from each other, the redundancy (in the meaning that the same information is obtained in duplicate) is eliminated. Accordingly, it is possible to efficiently obtain more diverse external information of the vehicle 1 while suppressing the increase of the costs.

In the present embodiment, the left front millimeter wave radar 21 is mounted on the left front lamp 1LF, and the right front LiDAR sensor 12 is mounted on the right front lamp 1RF. As a result, the combination of the types of sensors to be mounted on the left front lamp 1LF and the combination of the types of sensors to be mounted on the right front lamp 1RF are made different from each other. That is, external information obtained through the different types of sensors are complementarily used.

The millimeter wave radar is characterized by a long sensing distance and a high sensing speed. Therefore, it is enabled such a sensing manner that the presence of an object that is present in at least ahead of the vehicle 1 is first sensed by the left front millimeter wave radar 21, and then the attribute of the object is accurately specified using the information obtained by the right front LiDAR sensor 12.

Figure 4:
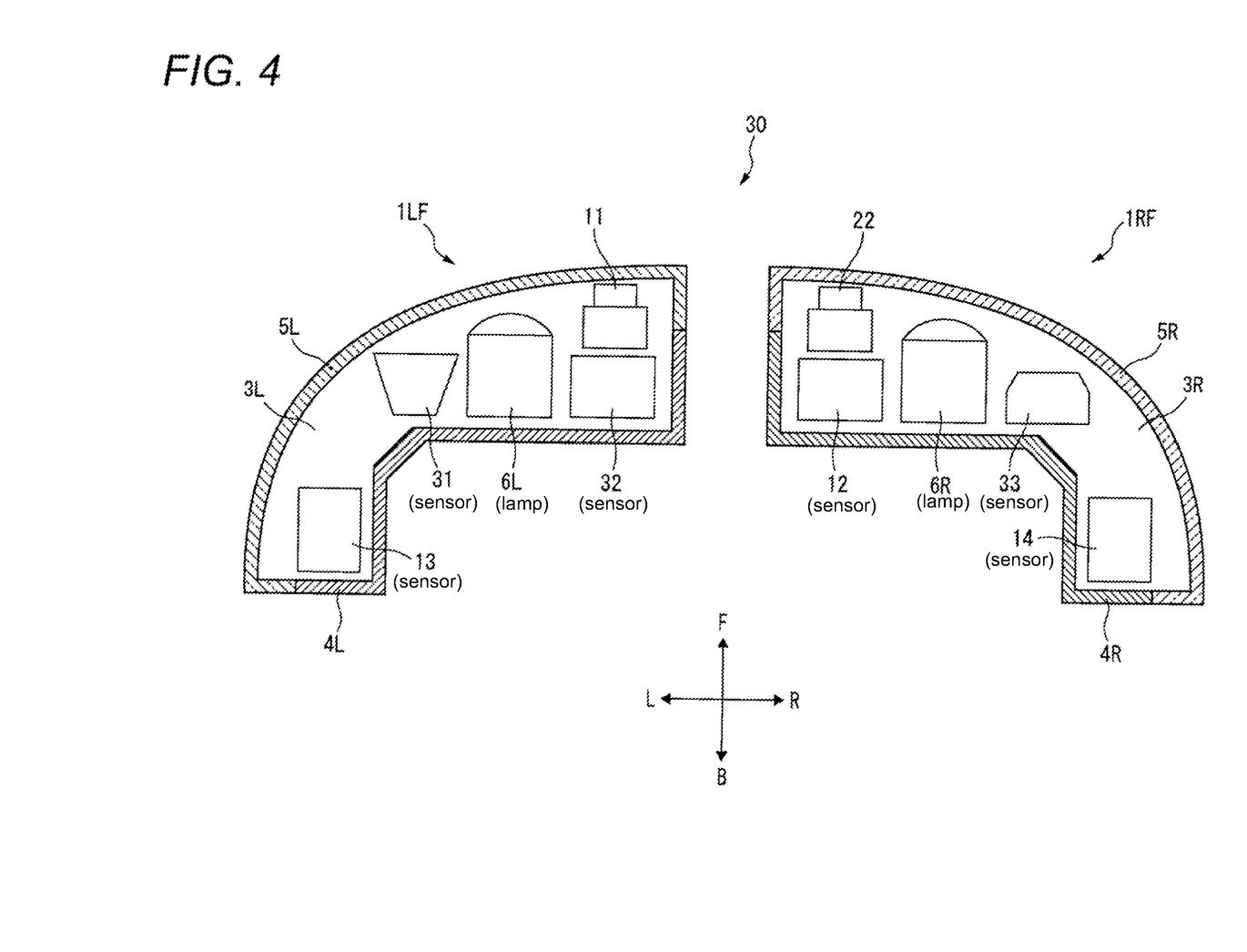
FIG. 4 illustrates a configuration of the sensor system according to a third embodiment.

FIG. 4 schematically illustrates a sensor system 30 according to a third embodiment. Components that are the same as or equivalent to those of the sensor system 20 according to the second embodiment are assigned with the same reference numerals, and repetitive descriptions for those will be omitted.

The sensor system 30 includes a left front ultrasonic sensor 31, a left front LiDAR sensor 32, and a right front millimeter wave radar 33 in place of the left front millimeter wave radar 21 in the configuration described referring to the sensor system 20.

The left front ultrasonic sensor 31 (one example of the first sensor) is mounted in the left front lamp chamber 3L of the left front lamp 1LF. The left front ultrasonic sensor 31 is configured to transmit ultrasonic waves (several tens of kHz to several GHz) and to receive reflected waves as a result of the ultrasonic waves being reflected by an object that is present at least ahead and on the right of the vehicle 1.

The left front ultrasonic sensor 31 can obtain the distance to the object associated with the reflected wave, for example, based on the time period from the time when the ultrasonic wave is transmitted in a certain direction to the time when the reflected wave is received. Further, by accumulating such distance data in association with the sensing position, it is possible to obtain information as to the shape of the object associated with the reflected wave. That is, the left front ultrasonic sensor 31 serves as a sensor for obtaining external information of at least ahead of the vehicle 1 (one example of the front-rear direction of the vehicle).

The left front LiDAR sensor 32 (one example of the first sensor) is mounted in the left front lamp chamber 3L of the left front lamp 1LF. Since the left front LiDAR sensor 32 has the same configuration as the right front LiDAR sensor 12, repetitive descriptions thereof will be omitted. That is, the left front LiDAR sensor 32 serves as a sensor for obtaining external information of at least ahead of the vehicle 1 (one example of the front-rear direction of the vehicle).

The right front millimeter wave radar 33 (one example of the second sensor) is mounted in the right front lamp chamber 3R of the right front lamp 1RF. Since the right front millimeter wave radar 33 has the same configuration as the left front millimeter wave radar 21, repetitive descriptions thereof will be omitted. The right front millimeter wave radar 33 serves as a sensor for obtaining external information of at least ahead of the vehicle 1 (one example of the front-rear direction of the vehicle).

That is, a combination of a plurality of types of sensors to be mounted on the left front lamp 1LF (the camera, the ultrasonic sensor, and the LiDAR sensor; one example of the first combination) and a combination of a plurality of types of sensors to be mounted on the right front lamp 1RF (the camera, the LiDAR sensor, and the millimeter wave radar; one example of the second combination) are different from each other.

By increasing the types of sensors to be mounted on the respective lamps, it is possible to obtain more diverse external information. On the other hand, by making the combination of the types of sensors to be mounted on the left front lamp 1LF and the combination of the types of sensors to be mounted on the right front lamp 1RF different from each other, the redundancy (in the meaning that the same information is obtained in duplicate) is eliminated. Accordingly, it is possible to efficiently obtain more diverse external information of the vehicle 1 while suppressing the increase of the costs.

In the present embodiment, the left front ultrasonic sensor 31 is mounted on the left front ramp 1LF, and the right front millimeter wave radar 33 is mounted on the right front ramp 1RF. As a result, the combination of the types of sensors to be mounted on the left front lamp 1LF and the combination of the types of sensors to be mounted on the right front lamp 1RF are made different from each other. That is, external information obtained through the different types of sensors are complementarily used.

The ultrasonic sensor is characterized by a short sensing distance but a low component cost. On the other hand, the millimeter wave radar is characterized by a long sensing distance and a high sensing speed. Therefore, it is possible to obtain a configuration capable of detecting both an object located at a short distance and an object located at a long distance with respect to the vehicle 1 while suppressing the costs.

Figure 5:
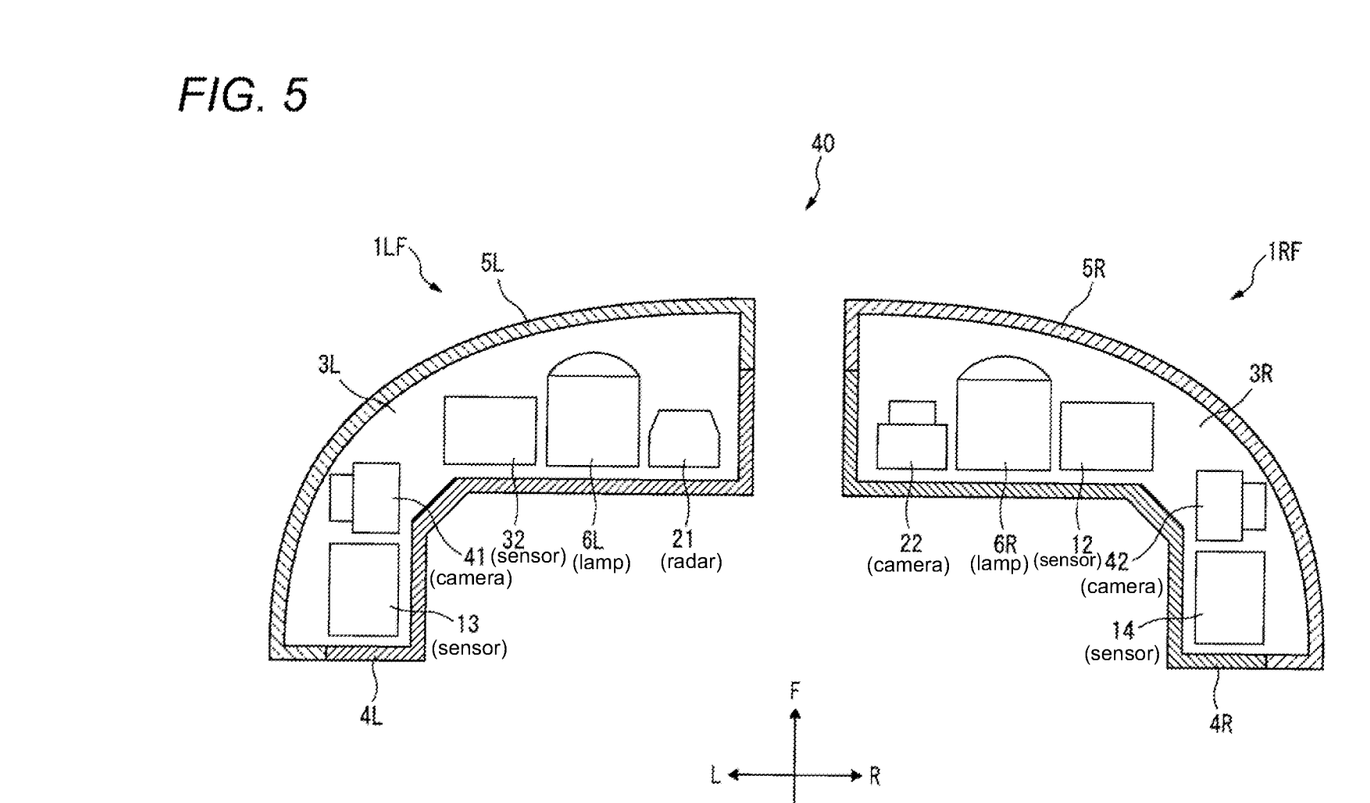
FIG. 5 illustrates a configuration of the sensor system according to a fourth embodiment.

FIG. 5 schematically illustrates a sensor system 40 according to a fourth embodiment. Components that are the same as or equivalent to those of the sensor system 20 according to the second embodiment are assigned with the same reference numerals, and repetitive descriptions for those will be omitted.

The sensor system 40 includes the left front LiDAR sensor 32 described referring to the sensor system 30 according to the third embodiment in place of the left front camera 11.

In the present embodiment, the left front millimeter wave radar 21 and the left front LiDAR sensor 32 are mounted on the left front lamp 1LF, and the right front camera 22 and the right front LiDAR sensor 12 are mounted on the right front lamp 1RF. As a result, the combination of the types of sensors to be mounted on the left front lamp 1LF and the combination of the types of sensors to be mounted on the right front lamp 1RF are made different from each other. That is, external information obtained through the different types of sensors are complementarily used.

As described above, the millimeter wave radar is characterized by a long sensing distance and a high sensing speed. Therefore, it is enabled such a sensing manner that the presence of an object that is present in at least ahead of the vehicle 1 is first sensed by the left front millimeter wave radar 21, and then the attribute of the object is accurately specified using the information obtained by the right front camera 22.

The sensor system 40 further includes a left camera 41. The left camera 41 (one example of the third sensor) is disposed so as to capture an image of at least on the left of the vehicle 1. That is, the left camera 41 serves as a sensor for obtaining external information of at least on the left of the vehicle 1.

The sensor system 40 further includes a right camera 42. The right camera 42 (one example of the fourth sensor) is disposed so as to capture an image of at least on the right of the vehicle 1. That is, the right camera 42 serves as a sensor for obtaining external information of at least on the right of the vehicle 1.

That is, a combination of the sensors to be mounted on the left front lamp 1LF for obtaining information of at least on the left of the vehicle 1 is the same as a combination of the sensors to be mounted on the right front lamp 1RF for obtaining information of at least on the right of the vehicle 1.

According to such a configuration, in addition to the advantages described with reference to the sensor system 10 according to the first embodiment, it is possible to further increase the diversity of the external information of the vehicle 1 that can be obtained.

Figure 6:
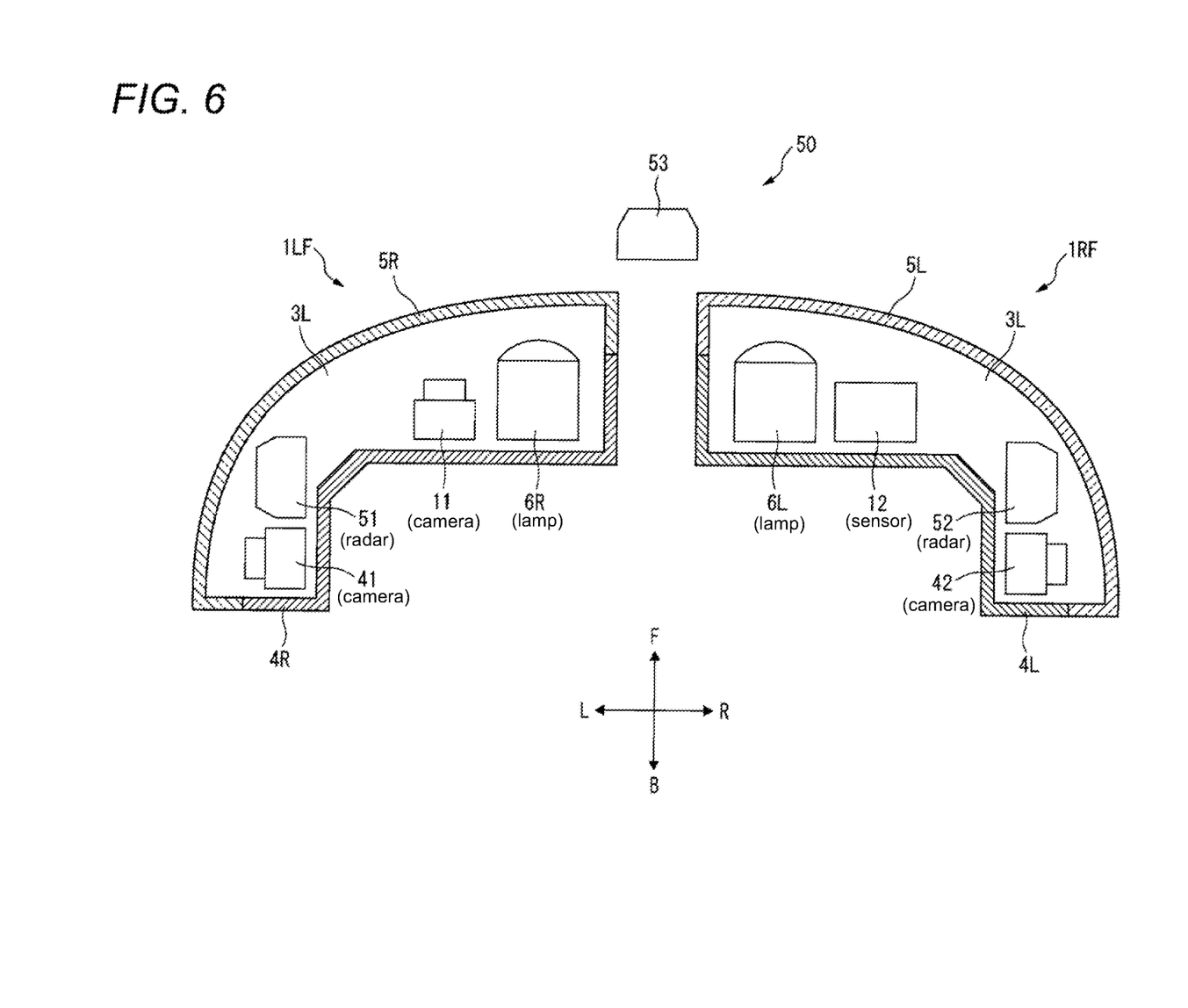
FIG. 6 illustrates a configuration of the sensor system according to a fifth embodiment.

FIG. 6 schematically illustrates a sensor system 50 according to a fifth embodiment. Components that are the same as or equivalent to those of the sensor system 10 according to the first embodiment are assigned with the same reference numerals, and repetitive descriptions for those will be omitted.

The sensor system 50 includes the left camera 41 and the left millimeter wave radar 51, that are described referring to the sensor system 40 according to the fourth embodiment, in addition to or in place of the left LiDAR sensor 13 (not illustrated in this drawing).

Since the left millimeter wave radar 51 (one example of the third sensor) has the same configuration as the left front millimeter wave radar 21 of the sensor system 20 according to the second embodiment, repetitive descriptions thereof will be omitted. The left millimeter wave radar 51 is disposed so as to obtain external information of at least on the left of the vehicle 1.

The sensor system 50 includes the right camera 42 and the right millimeter wave radar 52 described with reference to the sensor system 40 according to the fourth embodiment, in addition to or in place of the right LiDAR sensor 14 (not illustrated in this drawing).

Since the right millimeter wave radar 52 (one example of the fourth sensor) has the same configuration as the left front millimeter wave radar 21 of the sensor system 20 according to the second embodiment, repetitive descriptions thereof will be omitted. The right millimeter wave radar 52 is disposed so as to obtain external information of at least on the right of the vehicle 1.

The sensor system 50 further includes a front millimeter wave radar 53. Since the front millimeter wave radar 53 has the same configuration as the left front millimeter wave radar 21 of the sensor system 20 according to the second embodiment, repetitive descriptions thereof will be omitted. The front millimeter wave radar 53 is mounted on an exterior of the left front ramp 1LF and the right front ramp 1RF of the vehicle 1, such as on a front bumper. The front millimeter wave radar 53 is disposed so as to obtain external information of at least ahead of the vehicle 1.

Figure 7:
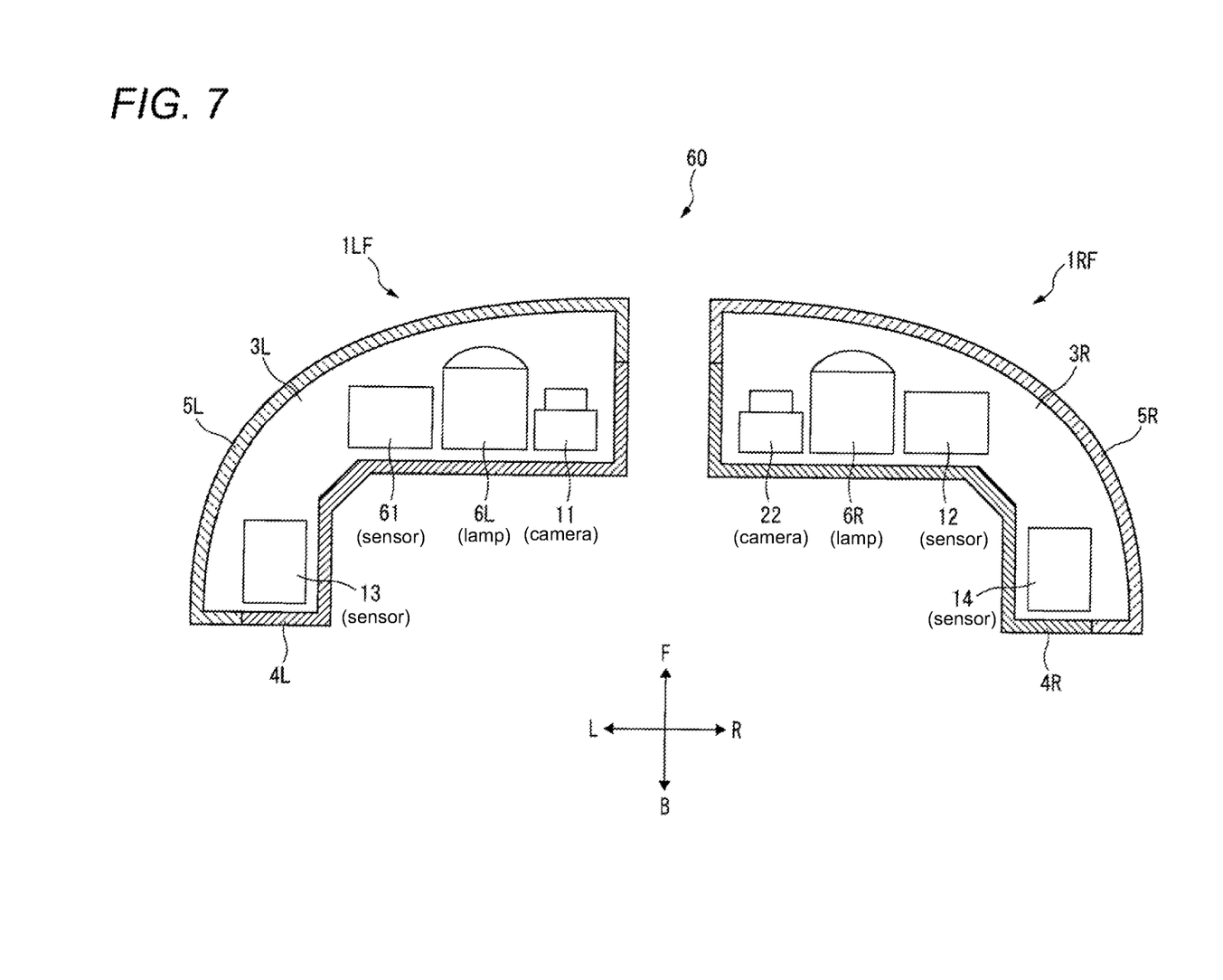
FIG. 7 illustrates a configuration of the sensor system according to a sixth embodiment.

FIG. 7 schematically illustrates a sensor system 60 according to a sixth embodiment. Components that are the same as or equivalent to those of the sensor system 20 according to the second embodiment are assigned with the same reference numerals, and repetitive descriptions for those will be omitted.

The sensor system 60 includes a left front LiDAR sensor 61 in place of the left front millimeter wave radar 21 of the sensor system 20.

Since the left front LiDAR sensor 61 has the same configuration as the right front LiDAR sensor 12, repetitive descriptions thereof will be omitted. That is, the left front LiDAR sensor 61 serves as a sensor for obtaining external information of at least ahead of the vehicle 1 (one example of the front-rear direction of the vehicle).

Figure 8:
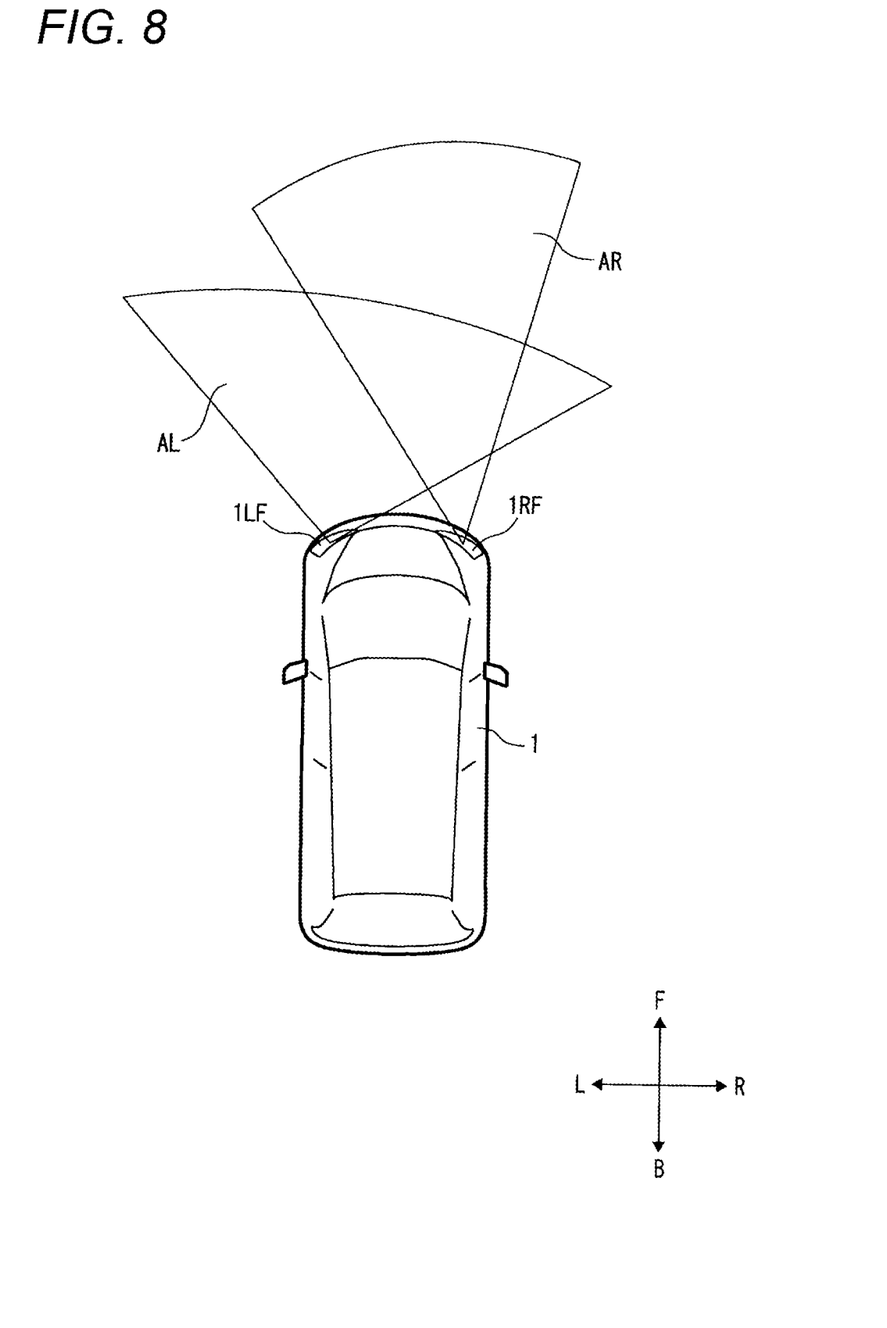
FIG. 8 illustrates a sensing range of the sensor system of FIG. 7.

In the present embodiment, as illustrated in FIG. 8, the sensing range AL (one example of the first sensing range) of the left front LiDAR sensor 61 and the sensing range AR (one example of the second sensing range) of the right front LiDAR sensor 12 are different from each other.

When attempting to obtain information of at least ahead of the vehicle 1, there could be a case where a sensing range of the sensor to be mounted on the left front lamp 1LF and a sensing range of the sensor to be mounted on the right front lamp 1RF overlap at least partially. In this case, the same information is obtained in duplicate from the areas where the sensing ranges overlap with each other.

In the present embodiment, the redundancy (in the meaning that the same information is obtained in duplicate) is eliminated by intentionally making the sensing range of the sensor to be mounted on the left front lamp 1LF to obtain external information of at least ahead of the vehicle 1 and the sensing range of the sensor to be mounted on the right front lamp 1RF to obtain external information at least ahead of the vehicle 1 different from each other. On the other hand, by making the sensing ranges different from each other, the external information obtained from at least ahead of the vehicle 1 is made diverse. Therefore, it is possible to efficiently obtain diverse external information of the vehicle 1 while suppressing the increase of the costs.

In particular, in the present embodiment, both the type of the sensor having the sensing range AL and the type of the sensor having the sensing range AR are LiDAR sensors, and are the same.

According to such a configuration, it is possible to further suppress component costs as compared with the case where the type of the sensor to be mounted on the left front lamp 1LF is made different from the type of the sensor to be mounted on the right front lamp 1RF.

More specifically, as illustrated in FIG. 8, the sensing range AL of the left front LiDAR sensor 61 is wider than the sensing range AR of the right front LiDAR sensor 12 in the left-right direction of the vehicle 1. On the other hand, the sensing range AR of the right front LiDAR sensor 12 is longer than the sensing range AL of the left front LiDAR sensor 61 in the front-rear direction of the vehicle 1.

According to such a configuration, a blind area in one of the sensing ranges of the left front LiDAR sensor 61 and the right front LiDAR sensor 12 can be efficiently compensated for by the other.

In the present embodiment, the cameras and the LiDAR sensors are mounted on each of the left front lamp 1LF and the right front lamp 1RF, and the sensing ranges of the two LiDAR sensors are different from each other. However, the sensors mounted on each of the left front lamp 1LF and the right front lamp 1RF may be selected from at least one of the camera, the LiDAR sensor, the millimeter wave radar, and the ultrasonic sensor. Accordingly, the sensors having different sensing ranges can be selected from at least one of the camera, the LiDAR sensor, the millimeter wave radar, and the ultrasonic sensor.

The above embodiments are merely examples for facilitating understanding of the gist of the presently disclosed subject matter. The configuration according to each of the above embodiments can be appropriately modified or improved without departing from the gist of the presently disclosed subject matter. It is also obvious that equivalents are included within the claimed subject matter.

In each of the illustrated configurations by referring to the first to fifth embodiments, the sensor to be mounted on the left front lamp 1LF and the sensor to be mounted on the right front lamp 1RF can be replaced symmetrically relative to the left-right direction.

In the descriptions referring to each of the above embodiments, the sensor system adapted to be mounted on the left front lamp 1LF and the right front lamp 1RF is exemplified. However, each of the sensor systems described above may also be mounted on a left rear lamp 1LB disposed in a left rear corner portion of the vehicle 1 illustrated in FIG. 1 and a right rear lamp 1RB disposed in a right rear corner portion of the vehicle 1.

As used herein, the expression "a left rear corner portion of the vehicle 1" means a portion included in a rear portion of the vehicle 1 and located on the left of a center in the left-right direction of the vehicle 1. As used herein, the expression "a rear portion of the vehicle 1" means a portion of the vehicle body of the vehicle 1 situating behind the driver's seat 2. As used herein, the expression "a right rear corner portion of the vehicle 1" means a portion included in a rear portion of the vehicle 1 and located on the right of a center in the left-right direction of the vehicle 1.

Although not illustrated in detail, the left rear lamp 1LB includes a left rear housing and a left rear translucent cover for defining a left rear lamp chamber. A light source such as a tail lamp is disposed in the left rear lamp chamber. At least one type of sensor for obtaining information of at least ahead of the vehicle 1, that is described with reference to the left front lamp 1LF, may be mounted in the left rear lamp chamber for obtaining information of at least behind the vehicle 1 (one example of the front-rear direction of the vehicle).

Although not illustrated in detail, the right rear lamp 1RB includes a right rear housing and a right rear translucent cover for defining a right rear lamp chamber. A light source such as a tail lamp is disposed in the right rear lamp chamber. At least one type of sensor for obtaining information of at least ahead of the vehicle 1, that is described with reference to the right front lamp 1RF, may be mounted in the right rear lamp chamber for obtaining information of at least behind the vehicle 1 (one example of the front-rear direction of the vehicle).

The present application is based on Japanese Patent Application No. 2016-180579 filed on Sep. 15, 2016, the entire contents of which are incorporated herein by reference.

The invention claimed is:

1. A sensor system mounted on a vehicle, comprising:
   sensors mounted on a left lamp of the vehicle to obtain external information of at least in a front or a rear of the vehicle; and
   sensors mounted on a right lamp of the vehicle to obtain external information of at least in the front or the rear of the vehicle,
   wherein the sensors mounted on the left lamp include a first combination of plural types of sensors including a first sensor and a second sensor;
   wherein the second sensors mounted on a left lamp includes a second combination of plural types of sensors including a first sensor and a second sensor;
   wherein the first sensor of the left lamp and the first sensor of the second lamp are provided at locations that mirror one another; and
   wherein the first sensor of the left lamp and the first sensor of the right lamp are different types of sensors.

2. The sensor system according to claim 1,
   wherein the first sensor of one of the left lamp and the right lamp is a camera; and
   wherein the first sensor of the other of the left lamp and the right lamp is a LiDAR sensor.

3. The sensor system according to claim 1,
   wherein the first sensor of one of the left lamp and the right lamp is a millimeter wave radar; and
   wherein the first sensor of one of the left lamp and the right lamp is a LiDAR sensor.

4. The sensor system according to claim 1,
   wherein the first sensor of one of the left lamp and the right lamp is a millimeter wave radar; and
   wherein the first sensor of one of the left lamp and the right lamp is an ultrasonic sensor.

5. The sensor system according to claim 1,
   wherein the first sensor of one of the left lamp and the right lamp is a millimeter wave radar; and
   wherein the first sensor of one of the left lamp and the right lamp is a camera.

6. The sensor system according to claim 1,
   wherein the identical type of sensor is a camera, a LiDAR sensor, a millimeter wave radar, or an ultrasonic sensor.

7. The sensor system according to claim 1, further comprising:
a third sensor mounted in the left lamp to obtain external information of at least in a left of the vehicle; and
a fourth sensor mounted in the right lamp to obtain external information of at least in a right of the vehicle,
wherein a type of the third sensor is identical to a type of the fourth sensor.

8. The sensor system according to claim 7,
wherein the type of the third sensor and the type of the fourth sensor are different from each of the type of the first sensor and the type of the second sensor.

9. A sensor system mounted on a vehicle, comprising:
a first sensor mounted on a left lamp of the vehicle to obtain external information of at least in a front or a rear of the vehicle;
a second sensor mounted on a right lamp of the vehicle to obtain external information of at least in the front or the rear of the vehicle;
a third sensor mounted on the left lamp of the vehicle to obtain external information of at least in a left of the vehicle; and
a fourth sensor mounted on the right lamp of the vehicle to obtain external information of at least in a right of the vehicle, wherein a sensing range of the first sensor and a sensing range of the second sensor overlap each other at least partially;
wherein a type of the first sensor and a type of the second sensor are different from each other; and
wherein a type of the third sensor and a type of the fourth sensor are identical with each other but are different from each of the type of the first sensor and the type of the second sensor.

10. The sensor system according to claim 9,
wherein one of the first sensor and the second sensor is a camera; and
wherein the other one of the first sensor and the second sensor is a LiDAR sensor.

11. The sensor system according to claim 9,
wherein one of the first sensor and the second sensor is a millimeter wave radar; and
wherein the other one of the first sensor and the second sensor is a LiDAR sensor.

12. The sensor system according to claim 9,
wherein one of the first sensor and the second sensor is a millimeter wave radar; and
wherein the other one of the first sensor and the second sensor is an ultrasonic sensor.

13. The sensor system according to claim 9,
wherein one of the first sensor and the second sensor is a millimeter wave radar; and
wherein the other one of the first sensor and the second sensor is a camera.

* * * * *